(12) United States Patent
Leichtfried et al.

(10) Patent No.: US 11,565,322 B2
(45) Date of Patent: Jan. 31, 2023

(54) ADDITIVELY MANUFACTURED COMPONENT AND PRODUCTION METHOD THEREFOR

(71) Applicant: PLANSEE SE, Reutte (AT)

(72) Inventors: Gerhard Leichtfried, Reutte (AT); Bernhard Tabernig, Reutte (AT)

(73) Assignee: Plansee SE, Reutte (AT)

( * ) Notice: Subject to any disclaimer, the term of this patent is extended or adjusted under 35 U.S.C. 154(b) by 281 days.

(21) Appl. No.: 16/649,770

(22) PCT Filed: Sep. 24, 2018

(86) PCT No.: PCT/AT2018/000077
§ 371 (c)(1),
(2) Date: Mar. 23, 2020

(87) PCT Pub. No.: WO2019/068117
PCT Pub. Date: Apr. 11, 2019

(65) Prior Publication Data
US 2020/0276639 A1   Sep. 3, 2020

(30) Foreign Application Priority Data
Oct. 5, 2017   (AT) .................................... 222/2017

(51) Int. Cl.
*B22F 10/20* (2021.01)
*B33Y 10/00* (2015.01)
(Continued)

(52) U.S. Cl.
CPC .............. *B22F 10/20* (2021.01); *B22F 1/065* (2022.01); *B22F 1/142* (2022.01); *B33Y 10/00* (2014.12);
(Continued)

(58) Field of Classification Search
CPC .......... B22F 10/20; B22F 1/065; B22F 1/142; B22F 2202/11; B22F 2202/13;
(Continued)

(56) References Cited

U.S. PATENT DOCUMENTS

2009/0047165 A1   2/2009   Syvanen et al.
2016/0293304 A1   10/2016  Hirota et al.
(Continued)

FOREIGN PATENT DOCUMENTS

CA       2954338 A1      2/2016
CN    103074532 A   *   5/2013
(Continued)

OTHER PUBLICATIONS

D Wang, Applied Science, vol. 7. No 4. p. 430. (Year: 2017).*
(Continued)

*Primary Examiner* — Anthony J Zimmer
*Assistant Examiner* — Nazmun Nahar Shams
(74) *Attorney, Agent, or Firm* — Laurence A. Greenberg; Werner H. Stemer; Ralph E. Locher (57) ABSTRACT

A component includes a multiplicity of individual powder particles of Mo, a Mo-based alloy, W or a W-based alloy that have been fused together to give a solid structure by a high-energy beam via an additive manufacturing method. The component has an oxygen content of not more than 0.1 at %. An additive manufacturing method includes producing the powder via the melt phase and providing a carbon content in the region of not less than 0.15 at %. The components are crack-free and have high grain boundary strength.

18 Claims, 4 Drawing Sheets

(51) Int. Cl.
  *B33Y 70/00* (2020.01)
  *B22F 1/065* (2022.01)
  *B22F 1/142* (2022.01)
  *B33Y 70/10* (2020.01)

(52) U.S. Cl.
  CPC ........... *B33Y 70/10* (2020.01); *B22F 2202/11* (2013.01); *B22F 2202/13* (2013.01); *B22F 2301/20* (2013.01); *B22F 2302/10* (2013.01)

(58) Field of Classification Search
  CPC ............. B22F 2301/20; B22F 2302/10; B33Y 10/00; B33Y 70/00
  See application file for complete search history.

(56) References Cited

U.S. PATENT DOCUMENTS

| | | | |
|---|---|---|---|
| 2017/0182594 A1 | 6/2017 | Crear et al. | |
| 2017/0182598 A1 | 6/2017 | Crear et al. | |
| 2017/0197330 A1 | 7/2017 | Surjaatmadja | |
| 2017/0252787 A1 | 9/2017 | Stawovy | |
| 2022/0134421 A1 | 5/2022 | Valls Angles | |

FOREIGN PATENT DOCUMENTS

| | | |
|---|---|---|
| CN | 103074532 A | 5/2013 |
| CN | 104889392 A | 9/2015 |
| CN | 105798295 A | 7/2016 |
| CN | 106001545 A | 10/2016 |
| CN | 106024254 A | 10/2016 |
| GB | 2538874 A | 11/2016 |
| JP | H01156449 A | 6/1989 |
| JP | H0827534 A | 1/1996 |
| WO | 2012055398 A1 | 5/2012 |
| WO | 2017077137 A2 | 5/2017 |

OTHER PUBLICATIONS

Machine Translation of CN103074532A (Year: 2013).*
Z W Chen, J. Mater. Sci (2017) 52:7415-7427 (Year: 2017).*
International Standard [ISO 481-1:2009] (Year: 2009).*

Braun J. et al.: "On the role of carbon in molybdenum manufactured by Laser Powder Bed Fusion", International Journal of Refractory Metals & Hard Materials, published by Elsevier Ltd., available online May 13, 2020, https://doi.org/10.1016/j.ijrmhm.2020.105283.
Braun J. et al.: "The Effect of Oxygen and Carbon on Molybdenum in Laser Powder Bed Fusion", Conference: EURO PM 2020, Oct. 5-7, 2020, Virtual Conference.
Kaserer L. et al.: "Microstructure and Mechanical Properties of Molybdenum-Titanium-Zirconium-Carbon Alloy TZM Processed via Laser Powder-Bed Fusion", International Journal of Refractory Metals and Hard Materials 93 (2020), available online Aug. 29, 2020, https://doi.org/10.1016/j.ijrmhm.2020.105369.
Wang D. et al.: "Dense Pure Tungsten Fabricated by Selective Laser Melting", Applied Sciences, (Apr. 23, 2017), vol. 7, No. 4, doi:10.3390/app7040430, p. 1-13, XP055533230.
Faidel D. et al.: "Investigation of the selective laser melting process with molybdenum powder", Additive Manufacturing 8 (2015) pp. 88-94, available online Sep. 21, 2015.
Gu D. et al.: "Selective Laser Melting Additive Manufacturing of Hard-to-Process Tungsten-Based Alloy Parts with Novel Crystalline Growth Morphology and Enhanced Performance", Journal of Manufacturing Science and Engineering, Aug. 2016, vol. 138, pp. 081003-1-081003-11.
Leitz K.-H. et al.: "Additive Manufacturing of Pore and Crack Free Molybdenum and Tugsten by Selective Laser Melting", European Power Metallurgy Association (EPMA)—Euro PM2019—AM Refractory & Heavy Metals—Manuscript refereed by Dr.-Ing Thomas Weissgaerber (Frauenhofer IFAM, Germany).
Braun J. et al.: "Molybdenum and tungsten manufactured by selective laser melting: Analysis of defect structure and solidification mechanisms", International Journal of Refractory Metals & Hard Materials 84 (2019) 104999, available online Jul. 10, 2019.
Kaserer L. et al.: "Fully dense and crack free molybdenum manufactured by Selective Laser Melting trough alloying with carbon", International Journal of Refractory Metals & Hard Materials 84 (2019) 105000, available online Jul. 11, 2019.
Wang D. et al, "Densification and crack suppression in selective laser melting of pure molybdenum", Materials & Design, Amsterdam, NL, (Sep. 1, 2017), vol. 129, doi:10.1016/j.matdes.2017.04.094, ISSN 0264-1275, pp. 44-52, XP055533234.

* cited by examiner

ADDITIVELY MANUFACTURED COMPONENT AND PRODUCTION METHOD THEREFOR

BACKGROUND OF THE INVENTION

Field of the Invention

The present invention relates to a component comprising a multitude of individual powder particles of molybdenum (Mo), a Mo-based alloy, tungsten (W) or a W-based alloy that have been fused together to give a solid structure by a high-energy beam via an additive manufacturing method. The invention further relates to an additive manufacturing method for production of a component and to the use of a powder for an additive manufacturing method.

Owing to their high melting point, low coefficient of thermal expansion and high thermal conductivity, Mo, W and their alloys are suitable for a wide variety of different high-performance applications, for example for x-ray anodes, heatsinks, high-temperature heating zones, thrusters, extrusion dies, mould parts for injection moulding, hot-runner dies, resistance welding electrodes or components for ion implantation systems. Moreover, these elements have a high density, which ensures good shielding characteristics from electromagnetic and particulate radiation. Because of the comparatively low ductility and high DBTT (ductile-brittle transition temperature), working properties are unfavourable both for machining and non-machining methods. Moreover, with the exception of Mo—Re and W—Re, these materials are of low suitability for welding. An industrial scale process for producing components from these materials is the powder-metallurgical production route in which corresponding starting powders are pressed and sintered.

The possibilities of geometric component execution that are achievable by additive manufacturing methods far exceed those in conventional methods. Especially in the case of materials such as Mo, W and alloys thereof, the additive manufacturing method is particularly advantageous since these materials, by comparison with other metallic materials, are much more difficult to work by standard, conventional manufacturing methods. In the additive manufacturing of metallic materials, usually powders, and less commonly also wires, are used as starting material. For metallic materials, several processes have become established, such as selective laser sintering (SLS), in which powder applied layer by layer is locally sintered by means of a laser beam, selective laser melting (SLM) and selective electron beam melting (SEBM), in which powder applied layer by layer is locally melted, and laser metal deposition (LMD), in which a powder supplied via a nozzle is melted. Additive manufacturing methods do not need any machining tools or moulds, which enables inexpensive manufacture of components in a small run. Moreover, high resource efficiency is achieved since non-fused or -sintered powder particles can be reused. A disadvantage of these methods at present is still the very low rate of formation.

Moreover, in additive methods, it should be taken into account that other metal-physical mechanisms are in effect by comparison with conventional consolidation methods, such as casting or sintering. While it is surface and boundary grain diffusion that determine densification in the case of sintering, the mechanisms of action in methods comprising local melting and solidification at high cooling rate, such as SLM, SEBM and LMD, are different, much more complex and also not yet completely understood. Mention should be made here of wetting characteristics, Marangoni convection, recoil effects as a result of evaporation, segregation, epitaxial grain growth, solidification time, heat flow, heat flow direction and internal stresses as a result of solidification shrinkage. Material concepts that are successful in conventional methods usually do not lead to faultless components in additive methods.

The production of pure W via selective laser melting is described in a journal article by Dianzheng Wang et al. (Appl. Sci. 2007, 7, 430), and the production of Mo via selective laser melting in a journal article by D. Faidel et al. (Additive Manufacturing 8 (2015) 88-94). WO2012055398 discloses a selective laser melting process for refractory metals, wherein the composition of the material can be altered by reaction with a reactive gas present in the atmosphere during the formation of the component. Document CN103074532 describes the laser melting of mechanically alloyed W—TiC powder.

The most commonly used additive manufacturing method is the selective laser melting method (SLM). This involves using a coating bar to apply a powder layer to a substrate. Subsequently, a laser beam is guided over this powder layer. This locally melts the powder particles, as a result of which the individual powder particles fuse to one another and to the layer applied beforehand. A layer of the component to be manufactured thus forms through successive local melting and subsequent solidification of powder particles. Subsequently, a further powder layer is applied to the powder layer already processed and the process begins again. The component is thus further constructed with every new powder layer, the direction of construction being arranged normal to the respective planes of the powder layers. Since the additive manufacturing process forms a characteristic microstructure, it is possible for the person skilled in the art to see whether a component is being produced by a conventional process or an additive process.

Mo and W have a high melting point, high thermal conductivity in the solid phase, and high surface tension and viscosity in the liquid phase. These materials are among the most difficult materials to work by an additive manufacturing method. The short time in the molten phase caused by the high thermal conductivity, combined with the high surface tension and high viscosity, promotes the balling effect, which in turn leads to pores and hence to crack-triggering defects and a low density. The balling effect also has an adverse effect on surface quality, specifically on surface roughness. Since these materials have very low fracture toughness, local defects, combined with the internal thermally induced stresses that are inherent to the process, lead to cracks.

Components composed of Mo and W that have been produced by means of selective laser or electron beam melting show a columnar crystalline structure, where the average grain aspect ratio (Grain Aspect Ratio—GAR-Value; ratio of grain length to grain width) in the direction of construction is typically greater than 8. In the plane normal to the direction of construction, an intercrystalline network of cracks forms, which indicates the melt trace of the laser or electron beam. The cracks are predominantly intercrystalline hot and cold cracks. Under stress that leads to fracture of the component, components produced in this way have predominantly intercrystalline fracture characteristics. Intercrystalline fracture characteristics are understood to mean a fracture caused predominantly by cracks along the grain boundaries. By virtue of these fracture characteristics, components produced in such a way have low fracture resistance and low fracture toughness.

Accordingly, the problem addressed by the present invention is that of providing a component composed of Mo, an Mo-based alloy, W or a W-based alloy that has been produced via an additive manufacturing method, for example via selective laser melting (SLM), selective electron beam melting (SEBM) or laser metal deposition (LMD), and does not have the aforementioned disadvantages. A particular problem addressed by the invention is that of providing a component having the following properties:

reduced defect frequency, especially crack frequency
improved fracture toughness
improved surface quality
improved density.

An additional problem addressed by the invention is that of providing a method of operationally reliable production of a component having the aforementioned properties. A further problem addressed by the invention is that of providing a powder that exhibits optimized characteristics for use in additive manufacturing.

SUMMARY OF THE INVENTION

The object is achieved by a component composed of Mo, W or an Mo- or W-based alloy and produced via an additive manufacturing method according to claim 1 the invention, by a method of producing a component according to claim 12 the invention, and by the use of a powder for additive manufacturing according to claim 18 the invention. Advantageous embodiments of the invention are specified in the dependent claims.

According to the present invention, the component comprising a multitude of individual powder particles of Mo, W, an Mo- or a W-based alloy that have been fused together to give a solid structure by a high-energy beam via an additive manufacturing method has an oxygen content of not more than 0.1 at %.

A Mo-based alloy is understood here to mean an alloy containing at least 50 at % Mo. More particularly, a Mo-based alloy contains at least 80, 90, 95 or 99 at % Mo. A W-based alloy contains at least 50 at % W. More particularly, a W-based alloy contains at least 80, 90, 95 or 99 at % W. Mo—W alloys in all concentration ranges are a preferred embodiment.

The individual powder particles are melted by means of an additive manufacturing method, it being advantageous to use SLM (selective laser melting) or SEBM (selective electron beam melting). The component is built up layer by layer. A powder layer is applied to a baseplate by means of a coating bar. The powder layer generally has a height of 10 to 150 µm. In SEBM, a defocused electron beam is first used to sinter the powder particles to one another so as to render them conductive. Subsequently, the powder is locally melted by the introduction of energy (preferably laser beam or electron beam). The beam constitutes a linear melt bath having a line width of typically 30 µm to 200 µm. The laser beam or electron beam is guided across the powder layer. By suitable beam guiding, the entire powder layer or else just part of the powder layer can be melted and subsequently solidified. The molten and solidified regions of the powder layer are part of the finished component. The unmelted powder is not part of the component produced. Subsequently, a further powder layer is applied by means of a coating bar and the electron beam or laser beam is guided again across this powder layer. This gives rise to a layered construction and a characteristic component structure. The guiding of the electron beam or laser beam results in formation of what is called a scan structure in each powder layer. In addition, in the direction of construction, which is determined by the application of a new powder layer, a typical layer structure is likewise formed. The scan structure and also the individual layers are apparent in the finished component.

The microstructure of powder particles fused selectively to form a solid structure by a high-energy beam (preferably by a laser beam or electron beam) via an additive manufacturing method differs distinctly from a microstructure produced by means of any other process, for example thermal spraying. For instance, thermal spraying involves accelerating individual spray particles in a gas stream and throwing them onto the surface of the component to be coated. The spray particles may be in fully or partly molten form (plasma spraying) or solid form (cold gas spraying). Layer formation takes place since the individual spray particles level out when they hit the component surface, adhere primarily as a result of mechanical interlocking and form the spray layer in a laminar manner. This forms a layer structure in the form of platelets. Layers produced in such a way show, in a plane parallel to the direction of construction, a grain extent at right angles to the direction of construction with an average grain aspect ratio (GAR; ratio of grain length to grain width) well above 2 and hence are distinctly different from layers/components produced via selective laser beam or electron beam melting that likewise have an average grain aspect ratio well above 2 in a plane parallel to the direction of construction, but with a grain extent parallel to the direction of construction.

What is essential to the invention is that the oxygen content is not more than 0.1 at %. The determination of the oxygen content is independent of whether it is in bound or elemental form. The oxygen content for Mo is preferably <0.09 at %, <0.08 at %, <0.07 at %, <0.06 at %, <0.05 at %, <0.04 at %, <0.03 at %, <0.02 at % or <0.01 at %. For W, the oxygen content is preferably <0.09 at %, <0.08 at %, <0.07 at %, <0.06 at %, <0.05 at %, <0.04 at %, <0.03 at %, <0.02 at % or <0.01 at %. The oxygen content is analysed by hot carrier gas extraction. In hot carrier gas extraction, the elements oxygen, nitrogen and hydrogen are released as gases at temperatures of 1500-2400° C. in a noble gas stream in the presence of carbon and detected by means of an infrared or thermal conductivity measurement cell. The method range for the determination of oxygen is greater than or equal to 5 µg/g.

The oxygen contents according to the invention achieve the following positive properties, as will be explained in detail hereinafter.

Reduction in defect frequency, especially in crack frequency
Reduction in the balling effect
Zero or reduced hot crack formation
Zero or reduced formation of intercrystalline cold cracks
Interdigitated grain boundaries
Reduction in the GAR value
Increase in fracture toughness
Improved surface quality If the oxygen content is above the inventive content, these properties are achieved to an insufficient degree. Typically, components composed of Mo, W, Mo- and W-based alloys that are produced by additive manufacturing methods have an oxygen content between 0.25 and 0.6 at %. When mechanically alloyed powders are used, it is also possible for distinctly higher oxygen contents of 2 at % or higher to occur. The oxygen content is not reduced by the additive manufacturing method, for example the selective laser beam or electron beam melting operation. When high-resolution analysis methods are employed, for example scanning or transmission electron microscopy, it is found that, in components according to the prior art, the oxygen has precipitated predominantly at the grain boundaries in the form of Mo oxide or W oxide. These precipitates are responsible for the intercrystalline fracture characteristics with consequently low fracture resistance and toughness of additively manufactured components composed of Mo, W and alloys thereof. The high oxygen content can result in formation both of hot and cold cracks. Hot cracks arise during the production as a result of a reduced grain boundary strength. In the given case, in the heat-affected zone of the melt trace, the grain boundary strength is unfavourably affected by the melting of the oxides precipitated at the grain boundaries. Cold cracks are attributable to thermally induced stresses in conjunction with defects (pores, microcracks) which function as seeds for cracking. If the grain boundary strength is much lower than the strength within the grain, as is the case in the prior art, an intercrystalline cracking profile occurs.

Moreover, a high oxygen content also enhances the balling effect. The oxygen is enriched in the boundary region of the melt zone, where it reduces the surface tension. Thus, Marangoni convection promotes material flow from the edge region into the centre of the melting zone, as a result of which the balling triggered by Plateau-Rayleigh instability is distinctly enhanced.

In an advantageous embodiment, the component has a carbon content of not less than 0.08 at %. The carbon content is measured by a combustion analysis. Combustion analysis involves combustion of the elements carbon and sulfur at temperatures of <1600° C. in an alumina crucible in an oxygen stream and determination thereof in the form of their oxides by means of an infrared cell. The method range for the determination of carbon is generally greater than or equal to 5 µg/g carbon. The determination of the carbon content is independent of whether it is in bound or elemental form. According to the prior art, the carbon content in additively manufactured Mo and W components is typically less than 0.01 at %.

As stated in the description of the method and the working examples, the inventive oxygen content is preferably established by addition of carbon to the starting powder. In principle, the properties according to the invention can also be achieved when the carbon content in the component is less than 0.08 at %. However, it has been found that, in the case of minor material inhomogeneities, which cannot be entirely avoided in an industrial process, a carbon content of not less than 0.08 at % is extremely advantageous. It is thus possible to establish the oxygen content according to the invention with high operational reliability. Moreover, local oxygen segregations are reliably avoided, or the oxygen is bound via the formation of oxycarbides in such a form that it can no longer have an unfavourable effect on grain boundary strength.

While a high carbon content has a very adverse effect on the properties in the case of conventionally manufactured (sintered) components, since coarse carbide precipitates form at the grain boundaries, additively manufactured Mo and W components, owing to the high cooling rate, can advantageously have a carbon content up to 25 at %. While even comparatively small values in the case of sintered material lead to impermissible embrittlement, additively manufactured components, owing to the fine-grain and interdigitated grain structure, have ductility which is still sufficient for many applications even at a carbon content corresponding to the eutectic concentration (17 at % for Mo, 22 at % for W). Components having a high carbon content up to 25 at % can be used, for example, for wear applications where high heat resistance and creep resistance are particular requirements. A carbon content greater than 1.1 at % for Mo or greater than about 0.8 at % for W has a favourable effect on melt spreading, since the liquidus temperature for Mo is lowered from 2620° C. to 2200° C. and for W from 3420° C. to about 2700° C. This can reduce the balling effect and allows the component properties to be correspondingly improved.

According to the application and resulting requirements, advantageous lower limits for the carbon content are 0.1 at %, 0.2 at %, 0.3 at %, 0.4 at %, 0.5 at %, 0.6 at %, 0.7 at %, 0.8 at %, 0.9 at % and 1 at %. Advantageous upper limits are 2 at %, 5 at %, 10 at % and 15 at %. For applications where maximum ductility is required, the upper limit is 2 at %.

In a further advantageous embodiment of the invention, the C content (in at %) is at least equal to the O content (in at %). Preferably, the C content (in at %) is at least 1.5 times, 2 times or 5 times as high as the O content (in at %). If high ductility of the component is required, it is advantageous when the C to O ratio does not exceed a value of 30, especially of 20 or 10. The C to O ratio according to the invention assures operationally reliable manufacture. The optimal C to O ratio depends on the particular requirements resulting from the application and can be established in a simple manner by appropriate tests.

In a further advantageous embodiment of the invention, the component includes carbides embedded in a matrix of pure Mo (in the case of Mo-based materials) or pure W (in the case of W-based materials). The carbides (for example $Mo_2C$ or MoC or $W_2C$ or WC) may form as early as in the course of production, as is the case in the working example, or be generated as a result of a downstream annealing treatment. The ductile matrix composed of pure Mo or pure W ensures that stresses can be degraded by plastic deformation and as such do not lead to cracks. Pure Mo or pure W is understood to mean that the proportion of dissolved elements is not more than 0.5 at %, preferably not more than 0.1 at % or 0.01 at %.

In a further advantageous embodiment, more than 25 at %, preferably more than 50 at % and especially preferably more than 80 or 90 at % the carbon is in the form of Mo carbide (for example $Mo_2C$ or MoC) and/or of tungsten carbide (for example $W_2C$ or WC). The carbides are in fine precipitated form and increase grain boundary strength in the case of low C contents, or heat and creep resistance in the case of high C contents.

In a further advantageous embodiment of the invention, the component in a fracture plane parallel to the direction of construction has transcrystalline fracture characteristics over at least 50% of the fracture surface. Preferably, the transcrystalline fracture component is 80%, especially preferably 90%. Transcrystalline fracture characteristics are understood to mean that, in the event of a fracture of the component triggered by excessive stress, the crack runs not along the grain boundaries but predominantly through the grains. The transition from inter- to transcrystalline fracture characteristics is attributable to the low oxygen content according to the invention. The transcrystalline fracture component is measured via a notched impact bending test according to standard (DIN EN ISO 148-1) at room temperature. The transcrystalline fracture component is evaluated by means of microscope images of the fracture surface generated by the notched impact bending test in a scanning electron microscope. In this case, at a representative site on the fracture surface, the area with transcrystalline fracture characteristics and the area with intercrystalline fracture characteristics are measured and the ratio of the transcrystalline area to the total area examined is used to determine the transcrystalline fracture component.

In a further advantageous embodiment of the invention, the component in a fracture plane at right angles to the direction of construction has transcrystalline fracture characteristics over at least 50% of the fracture area. The transcrystalline fracture component is preferably 80%, especially preferably 90%.

In a further advantageous embodiment of the invention, the component, independently of the orientation of the fracture plane, has transcrystalline fracture characteristics over at least 50% of the fracture area. The transcrystalline fracture component is preferably 80%, especially preferably 90%. The measurement and determination of the transcrystalline fracture characteristics are conducted as described above. Owing to this property, the component, independently of the orientation, has a high grain boundary strength and hence high fracture toughness.

In a further advantageous embodiment of the invention, the component is free of intermetallic phases. An intermetallic phase consists of two or more metals, where the lattice structure of this phase differs from the lattice structure of the base material. The avoidance of intermetallic phases has a favourable effect on the ductility of the component.

In a further advantageous embodiment of the invention, the sum total of metallic alloy elements is not more than 2 at %, preferably not more than 1 at %, not including Mo as alloy element in W or W as alloy element in Mo in this value. By virtue of this small proportion, the solidifying and hence embrittling effect of further alloy elements is limited.

In a further advantageous embodiment of the invention, the component in a plane parallel to the direction of construction has an average GAR value in a direction parallel to the direction of construction of less than 5. The component preferably does not have any grain extent in a direction at right angles to the direction of construction. By virtue of a high grain aspect ratio parallel to the direction of construction, in the event of stresses at right angles to the direction of construction, an intercrystalline fracture profile along the grain boundaries that extend essentially in the direction of construction is promoted, since the fracture distance is short and hence the fracture area generated (owing to the directed course of the grain boundaries) is small. A small GAR value, by contrast, ensures sufficient fracture toughness even in the case of such stresses at right angles to the direction of construction. More preferably, the GAR value is less than 3.

The present invention further relates to an additive manufacturing method for production of a component, having the following steps:
  providing a starting powder including particles of molybdenum, of a molybdenum-based alloy, tungsten or a tungsten-based alloy, where the individual powder particles have been granulated and/or produced via the melt phase and the powder has a carbon content in the region of not less than 0.15 at %;
  layer-by-layer fusion of the powder particles of the starting powder with a high-energy beam.

By the additive manufacturing method according to the invention, the advantages elucidated above in relation to the component according to the invention are achieved reliably and in an operationally reliable manner. Moreover, the aforementioned advantageous embodiments of the invention are also advantageous for the method according to the invention.

The component produced by the method according to the invention therefore advantageously has at least one of the following properties:
  oxygen content 0.1 at %, especially preferably for Mo<0.09 at %, <0.08 at %, <0.07 at %, <0.06 at %, <0.05 at %, <0.04 at %, <0.03 at %, <0.02 at % or <0.01 at % and for W<0.09 at %, <0.08 at %, <0.07 at %, <0.06 at %, <0.05 at %, <0.04 at %, <0.03 at %, <0.02 at % or <0.01 at %
  carbon content ≥0.08 at %, especially preferably ≥0.1 at %, ≥0.2 at %, ≥0.3 at %, ≥0.4 at %, ≥0.5 at %, ≥0.6 at %, ≥0.7 at %, ≥0.8 at %, ≥0.9 at % or ≥1 at %
  carbon content ≤25 at %, especially preferably ≤15 at %, ≤10 at %, ≤5 at % or ≤2 at %
  carbon content (in at %) ≥oxygen content (in at %), especially preferably C (in at %)/O (in at %) ≥1.5, ≥2 or ≥5 and C (in at %)/O (in at %) ≤30, ≤20 or ≤10
  component includes carbides embedded in a matrix of pure Mo or pure W. Pure Mo or pure W is understood here to mean that the proportion of dissolved elements is not more than 0.5 at %, preferably not more than 0.1 at % or 0.01 at %.
  More than 25 at %, especially preferably more than 50 at % or more than 80 at %, based on the total proportion of carbon present, is in the form of Mo carbide or W carbide.
  Component in a fracture plane parallel to the direction of construction has transcrystalline fracture characteristics over at least 50% of the fracture area; the transcrystalline fracture component is especially preferably ≥80% or ≥90%.
  Component in a fracture plane at right angles to the direction of construction has transcrystalline fracture characteristics over at least 50% of the fracture area; the transcrystalline fracture component is especially preferably ≥80% or ≥90%.
  Component, independently of the orientation of the fracture plane, has transcrystalline fracture characteristics over at least 50% of the fracture area; the transcrystalline fracture component is especially preferably ≥80% or ≥90%.
  Component is free of intermetallic phases.
  Sum total of metallic alloy elements is not more than 2.0 at %, especially preferably not more than 1.0 at %, not including Mo as alloy element in W or W as alloy element in Mo.
  Average GAR value in a plane parallel to the direction of construction is less than 5, especially preferably less than 3.

It is essential to the invention that the powder has a carbon content of not less than 0.15 at % and the powder particles have been produced via one of the following routes:
  i) Production by granulation
  ii) Production by a melt phase
  iii) Production by granulation and a melt phase.

This ensures that the advantages according to the invention are achieved in additive manufacturing, which comprises fusion of the powder particles with a high-energy beam. Particularly preferred carbon contents for Mo and Mo-base materials are ≥0.2 at %, ≥0.4 at %, ≥0.6 at %, ≥0.8 at %, ≥1.0 at %, ≥1.25 at % and ≥1.5 at %. Particularly preferred carbon contents for W and W-base materials are ≥0.2 at %, ≥0.4 at %, ≥0.6 at %, ≥0.8 at %, ≥1.0 at %, ≥1.25 at % and ≥1.5 at %. If the carbon content is below 0.15 at %, the advantages according to the invention are not achieved, as will be set out in detail hereinafter.

According to a preferred embodiment, the individual powder particles are produced by a melt phase. Owing to the small particle volume, even without additional measures, this leads to a high cooling rate. The high cooling rate leads to very uniform distribution of the carbon, for example in that the carbon is forcibly dissolved in the Mo or W crystal lattice or has been precipitated in the form of ultra-small carbide particles.

According to another advantageous embodiment the powder particles are produced by granulation. Granulation is the process in which the finely dispersed primary powder particles are made to adhere to form larger, multiparticle entities called granules. The process will be described in detail below. Comparing to mechanically milled powder the granulated powder particles have a good flow behaviour, that enable an even application of powder layers. Moreover, a high oxygen content and other impurities caused by wear of milling unit can be avoided as explained further below. The carbon can be introduced via the finely dispersed primary particles or via a carburizing process. The carburation process advantageously takes place via a gas phase (for example methane). It is particularly advantageous if the powder particles are produced by granulation and a melt phase. Initially, the finely dispersed primary particles are granulated and then the granulate is spheroidized via a melt phase. The advantages are mentioned below.

The preferred upper limit for the carbon content is 25 at %, especially preferably 15 at %, 10 at % or 5 at %. If the aim is optimal fracture toughness, the advantageous C content is not more than 2 at %. The inventive carbon content in conjunction with the homogeneous distribution achieved via the melt phase has a positive effect on the additive manufacturing process and on the properties of the component produced with this powder.

In this way, the following positive effects are achieved:
reduction in the O content
reduction in the balling effect through avoidance of Marangoni convection from the outside of the melt bath in the direction of the centre of the melt bath; hence reduction in defect density
complete or substantial avoidance of hot cracks
complete or substantial avoidance of cold cracks
high grain boundary strength
predominantly transcrystalline fracture characteristics
small grain size
significant interlocking of the grain boundaries
high fracture toughness
operationally reliable manufacture In the case of mechanically alloyed powders, these advantages are not achieved to a sufficient degree, if at all. For instance, the mechanical alloying of powders in high-energy mills, owing to the long grinding times, the continuous creation of new surface area by crushing and welding of the powder particles, and the heat that arises in the grinding, introduces oxygen into the powder to a high degree. This oxygen either cannot be completely reduced by the carbon, which is associated with an increased tendency to balling and cracks, or leads to CO-filled pores.

The layer-by-layer fusion of powder particles of the starting powder with a high high-energy beam is preferably effected by means of a conventional SLM, SEBM or LMD process. These processes have already been described in the preceding text.

In an advantageous embodiment of the invention, the step of providing the starting powder comprises carburization and spheroidization in the melt phase, with performance of the step of carburization before, during or after the step of spheroidization. In spheroidization, powder particles of a starting powder which may include agglomerates, for example, are re-melted to give dense, homogeneous powder particles. The powder particles are in spherical form and hence have excellent flow properties. Carburization is understood to mean carbonization, where the carbonizing agent may be in solid, liquid or gaseous form. The carburization is preferably effected before or especially preferably during the spheroidization.

In a further advantageous embodiment of the invention, the spheroidization is effected in C-containing atmosphere in a plasma. Preference is given here to using an inductively coupled high-frequency plasma. A gas is put into the plasma state here by inducing a high-frequency AC voltage. This generates eddy currents that heat the gas stream to plasma temperature. Owing to the absence of electrodes in the discharge zone, a very pure plasma is generated. The plasma gas is preferably argon, to which $CH_4$ is added as carbonizing agent.

In a further advantageous embodiment of the invention, the providing of the starting powder comprises granulation, wherein a carbonaceous substance is added to the granular material before or during the granulation. Preferably, the carbonaceous substance is thermal black or an organic binder. Granulation is understood here to mean a process in which a raw powder (primary particles) is agglomerated to give a granular material (secondary particles).

Advantageously, the granulation includes at least the following manufacturing steps:
providing a slip comprising raw Mo and/or W powder, a binder and a liquid;
producing a granular material by spray-drying the slip to give a granular material;
optionally partly or fully debinding the granular material.

Binders used may, for example, be polyvinyl alcohol or paraffin. The binder may also serve simultaneously as carbonaceous substance (carbonizing agent). The liquid used is preferably a readily evaporable liquid, for example acetone, alcohol or water. The granular material is preferably produced by spray-drying. This involves spraying the slip at high pressure through a nozzle into the interior of a spray tower to form droplets. The sprayed material, on its flight path, is dried by a hot gas stream (for example nitrogen) introduced into the spray tower and collected as granular material in the lower part of the tower. Prior to the spheroidization, granular material is preferably debinded in the liquid phase. Debinding is understood by the person skilled in the art to mean the partial or complete removal of the binder. Debinding can be effected chemically (for example by acetone) or thermally (by calcining).

The inventive carbon content of the starting powder is established by mixing a carbon-containing substance (for example thermal black) into the raw powder and/or by the debinding, in that the binder is not fully removed.

In a further advantageous embodiment of the invention, in the step of layer-by-layer fusion, thermal energy is additionally supplied to the component to be produced. This can be effected, for example, by heating the base plate on which the component to be produced is constructed layer by layer. The temperature of the base plate here is preferably >400° C. More preferably, the base plate has a temperature of >700° C. or >900° C. Preferably, the temperature is not more than 1300° C. The elevated component temperature results in much slower cooling of the melt bath, as a result of which the formation of cold cracks is avoided. The longer cooling period and consequently longer melt phase improves the spread of the melt and hence increases the density of the component. Moreover, the formation of pores (for example filled with CO) is avoided, or they are reduced in number or size.

The objective of the invention is also fulfilled in that powder including particles of Mo, a Mo-based alloy, W or a W-based alloy, the particles having been produced via granulation and/or the melt phase and having an average carbon content in the region of not less than 0.15 at %, is used for an additive manufacturing method.

In an advantageous embodiment, the additive manufacturing method is selective laser melting, selective electron beam melting or laser metal deposition.

Further advantages of the invention are apparent from the description of working examples which follows, with reference to the appended figures.

BRIEF DESCRIPTION OF THE SEVERAL VIEWS OF THE DRAWING

FIG. 5c: EELS spectrum of inventive Mo—C sample No. 3 produced via SLM at the measurement point marked in FIG. 5a;

DETAILED DESCRIPTION OF THE INVENTION

Examples

Samples According to the Prior Art:

For the noninventive experiments, spheroidized Mo and W powders were used. For both powders, a 15 to 40 μm sieve fraction was used. The Mo powder had an O content of 0.39 at % and a C content of 0.01 at %, the W powder an O content of 0.34 at % and a C content of 0.009 at %. Both powders were processed by means of a 400 W SLM system to give samples having dimensions of 10 mm×10 mm×10 mm and to give notched impact bending samples according to DIN EN ISO 148-1. The notched impact bending samples were constructed with a notch pointing upward on the base plate. Thus, a fracture surface generated by the notched impact bending test lies parallel to the direction of construction. The system has construction space heating. For the experiments, the base plate was heated to 800° C.

Figure 1:
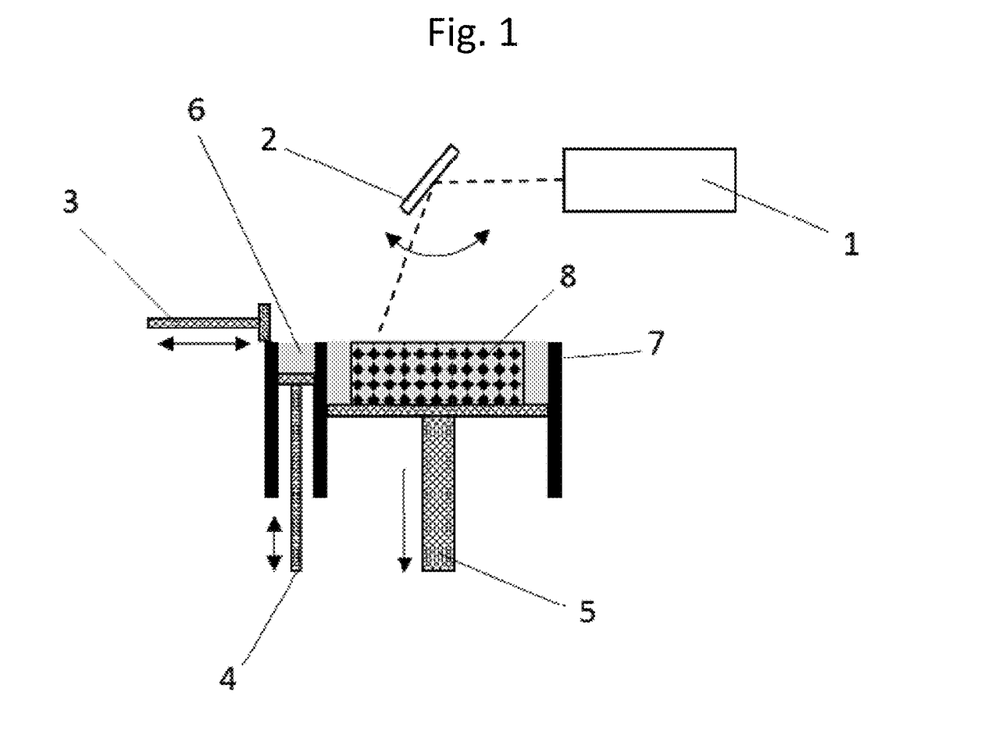
FIG. 1: schematic diagram of the selective laser melting (SLM) process.

The SLM process is shown in schematic form in FIG. 1. A control system controls, inter alia, the laser 1, the laser mirror 2, the coating bar 3, the powder feed 4 from a powder reservoir vessel 6 and the position of the base plate 5 in the construction space 7. With the aid of a coating bar, a layer of powder was applied. The laser beam guided with the aid of a laser mirror scanned across the powder layer and melted the particles and partly melted the already melted and solidified layer beneath where there is material according to the component design (component 8). Subsequently, the base plate was lowered by 30 μm and the coating bar applied a further layer of powder, and the process cycle began anew.

The following process parameters were employed (see Table 1):

TABLE 1

|  | Mo | W |
| --- | --- | --- |
| Laser power in W | 400 | 400 |
| Scan rate in mm/s | 600 | 500 |
| Hatching distance in μm | 100 | 100 |
| Scan strategy | Meandering/layers offset by 67° | Meandering/layers offset by 67° |

The noninventive samples (FIG. 1, label 8) were divided from the base plate by wire erosion and the component density was determined by the buoyancy method (hydrostatic weighing), with closure of open pores beforehand by dipping in molten paraffin. For Mo a density of 95% of the theoretical density was determined, and for W a density of 94%. The O and C contents of the samples were determined by means of chemical analysis, sections were prepared, the notched impact samples were tested according to DIN EN ISO 148-1, and the fracture surface was analysed by scanning electron microscopy.

Figure 2A:
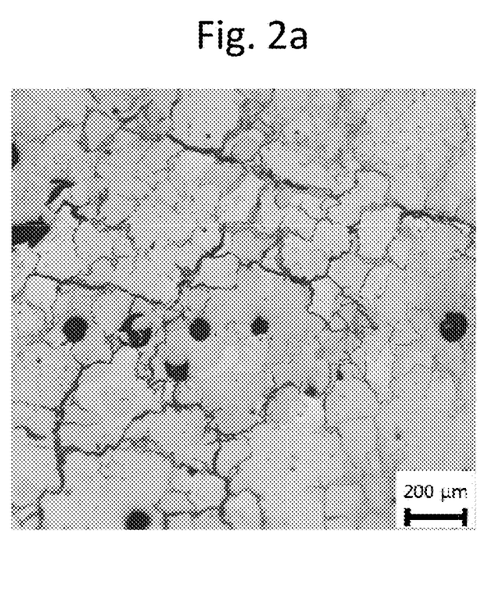
FIG. 2a: light micrograph of a Mo component produced via SLM according to prior art with section plane at right angles to the direction of construction.
Figure 2B:
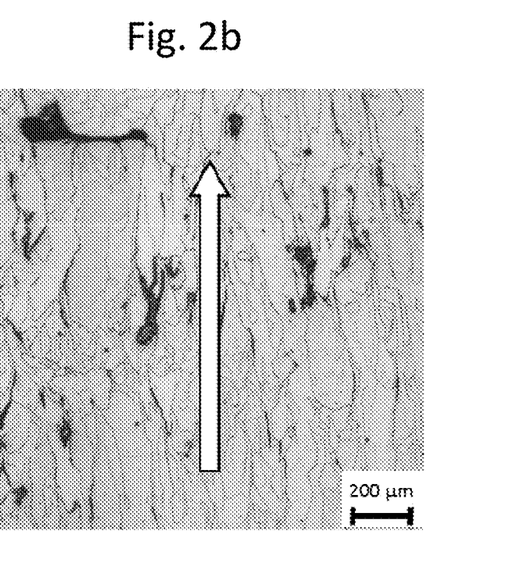
FIG. 2b: light micrograph of a Mo component produced via SLM according to prior art with section plane in the direction of construction (the direction of construction is shown by means of an arrow)
Figure 3:
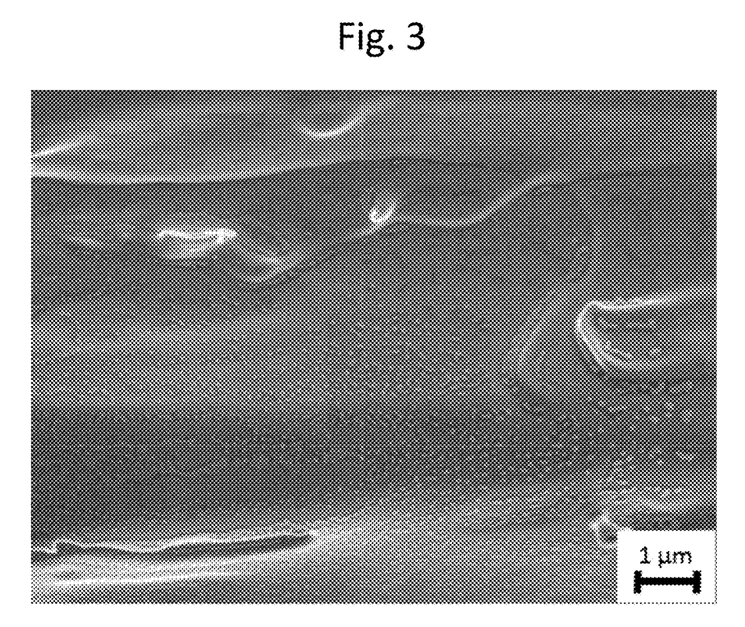
FIG. 3: scanning electron micrograph of the fracture surface parallel to the direction of construction of a Mo component produced via SLM according to the prior art.

The noninventive Mo component had an O content of 0.39 at % and a C content of 0.009 at %; the W component had an O content of 0.32 at % and a C content of 0.015 at %. The microstructure of pure Mo is reproduced by way of example in FIGS. 2a and 2b. In FIG. 2a, the section plane lies at right angles to the direction of construction. The section plane is thus parallel to the base plate. The component has many pores and intercrystalline cracks in a tile-like arrangement, which indicate the scanning structure of the process, i.e. the laser beam guiding. FIG. 2b shows the microstructure in a plane parallel to the direction of construction. The grain structure is in the form of columnar crystals having an average grain aspect ratio (GAR value) of about 8 in the direction of construction. The GAR value was determined by image analysis by determining the average grain length and the average grain width and subsequently dividing the average grain length by the average grain width. In this image too, it is possible to see pores and intercrystalline cracks. The fracture surface generated by the notched impact bending test is reproduced by way of example for Mo in FIG. 3. The fracture surface produced is parallel to the direction of construction. The proportion of intercrystalline fracture is 100%. Mo oxide precipitates are apparent at the grain surface. Components produced according to prior art, owing to the many cracks and pores and intercrystalline fracture characteristics, show inadequate fracture resistance and fracture toughness.

Inventive Samples:

For the production of Mo—C or W—C powders, production methods A, B and C were employed.

A. Reactive spheroidization in the melt phase
Spheroidization in the melt phase was effected in C-containing atmosphere in a plasma. The particles of the starting material in agglomerate form were conveyed by means of an Ar—$CH_4$ carrier gas mixture into an inductively coupled plasma torch and completely melted thereby. $CH_4$ thus became part of the plasma gas. In a downstream freefall zone for cooling, the molten particles took on a spherical form owing to the surface tension, solidified and were collected at the end of the freefall zone in a collecting vessel. This process resulted in simultaneous carburization of the particles, with simple adjustability of the carbon content of the powder via the $CH_4$ to Ar ratio. Thereafter, the powders were sieved off and the 15 to 40 µm sieve fraction was used for the further experiments.

B. Spheroidization of a granular Mo—C or W—C material First of all, a slip was produced from
raw powder, consisting of Mo and/or W powder and thermal black,
paraffin and
water
by mixing. The slip contained about 75 wt. % of powder, 0.75 wt. % of paraffin and, as the balance, water. The slip was stirred vigorously in order to maintain a homogeneous concentration of the mixture and then spray-dried. The slip was sprayed here at 3 bar through a nozzle into the interior of a spray tower to form droplets and dried in a nitrogen stream (nitrogen inlet temperature: 240° C., outlet temperature: 160° C.). The agglomerated powder thus produced was calcined and at the same time debinded in an alumina boat in a furnace under hydrogen at a temperature of 1100° C. for 1 hour. Thereafter, the powder was crushed and the coarse fraction was sieved off.

C. Powder of molybdenum with an average particle size of 4.2 µm ($d_{50}$ determined by LDA—Laser Diffraction Analysis) was mixed with thermal black in a shear mixer and converted into a slip by addition of polyvinyl alcohol and acetone. The granulation was done by spray drying. The slip was sprayed through a nozzle into the interior of a spray tower to form droplets and dried in a nitrogen counter current and collected in the lower part of the tower as granulate. The binder was removed from the granulate by slow heating to 1200° C.

The powder thus produced was analysed for carbon (combustion analysis with measurement of IR absorption) and oxygen (hot carrier gas extraction). The characteristic properties of the granular material are shown in Table 2.

TABLE 2

| No. | Base metal | Production method | Oxygen content [at %] | Carbon content [at %] |
|---|---|---|---|---|
| 1 | Mo | A | 0.36 | 0.62 |
| 2 | Mo | A | 0.26 | 3.2 |
| 3 | Mo | B | 0.19 | 17.0 |
| 4 | W | A | 0.26 | 0.23 |

TABLE 2-continued

| No. | Base metal | Production method | Oxygen content [at %] | Carbon content [at %] |
|---|---|---|---|---|
| 5 | W | A | 0.22 | 7.3 |
| 6 | W | A | 0.18 | 24.2 |
| 7 | Mo—W mixture (70 at % Mo; 30 at % W) | B | 0.37 | 1.4 |
| 8 | Mo | C | 0.43 | 3.1 |

Figure 4A:
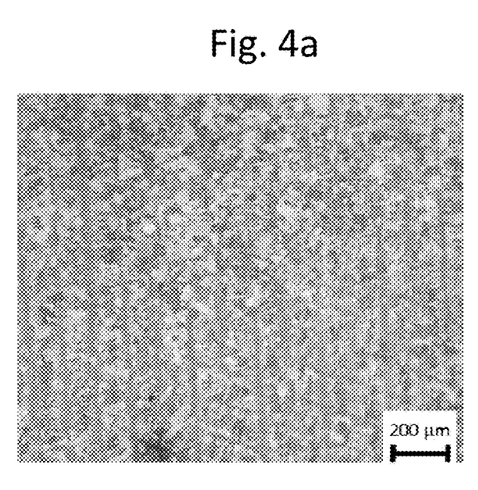
FIG. 4a: light micrograph of inventive Mo—C sample No. 3 produced via SLM with section plane at right angles to the direction of construction.
Figure 4B:
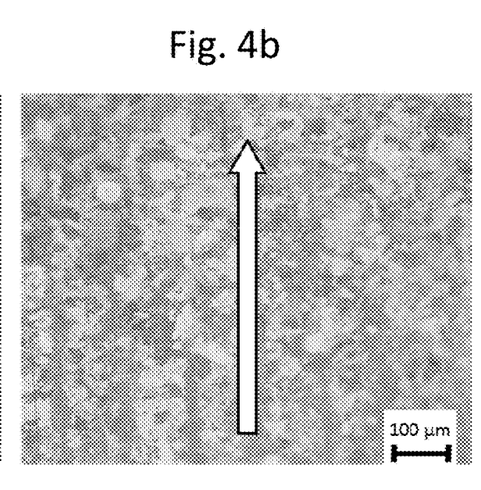
FIG. 4b: light micrograph of inventive Mo—C sample No. 3 produced via SLM with section plane in the direction of construction (the direction of construction is shown by means of an arrow)
Figure 5A:
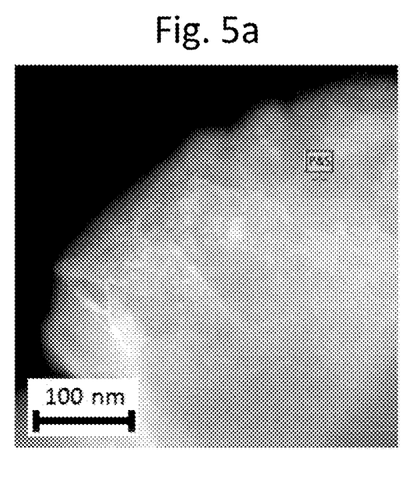
FIG. 5a: transmission electron micrograph (STEM HAADF) of inventive Mo—C sample No. 3 produced via SLM.
Figure 5B:
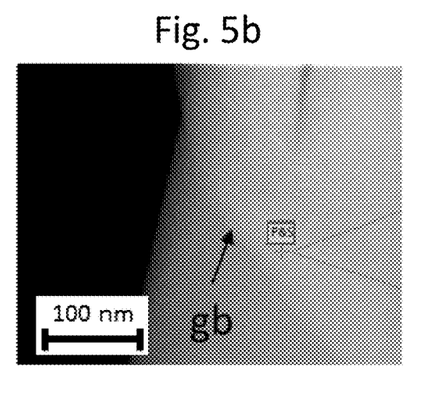
FIG. 5b: transmission electron micrograph (STEM HAADF) of inventive Mo—C sample No. 3 produced via SLM (gb marks a grain boundary)
Figure 5C:
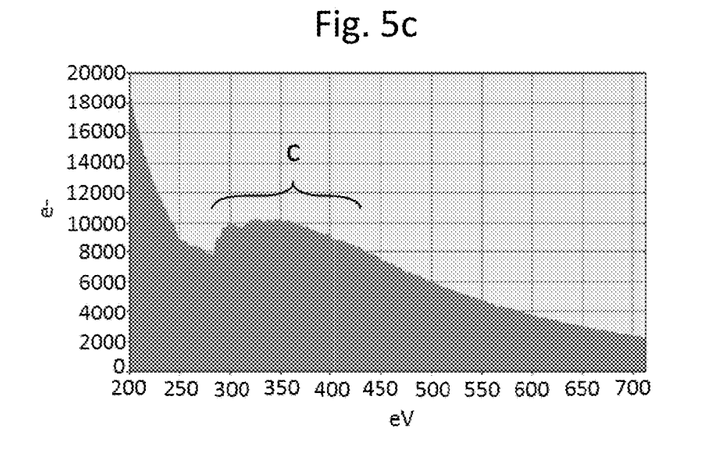
Figure 5D:
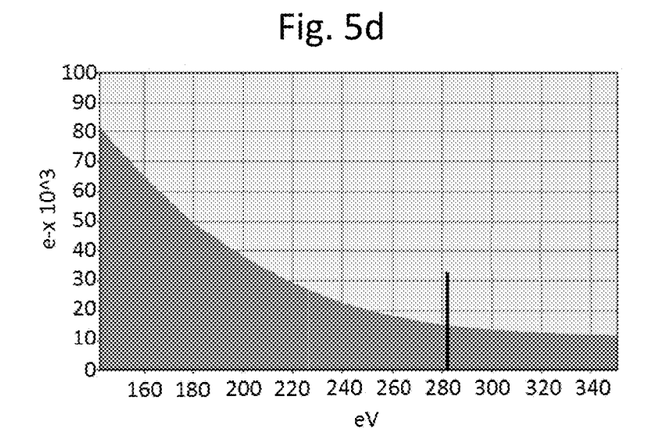
FIG. 5d: EELS spectrum of inventive Mo—C sample No. 3 produced via SLM at the measurement point marked in FIG. 5b.
Figure 6:
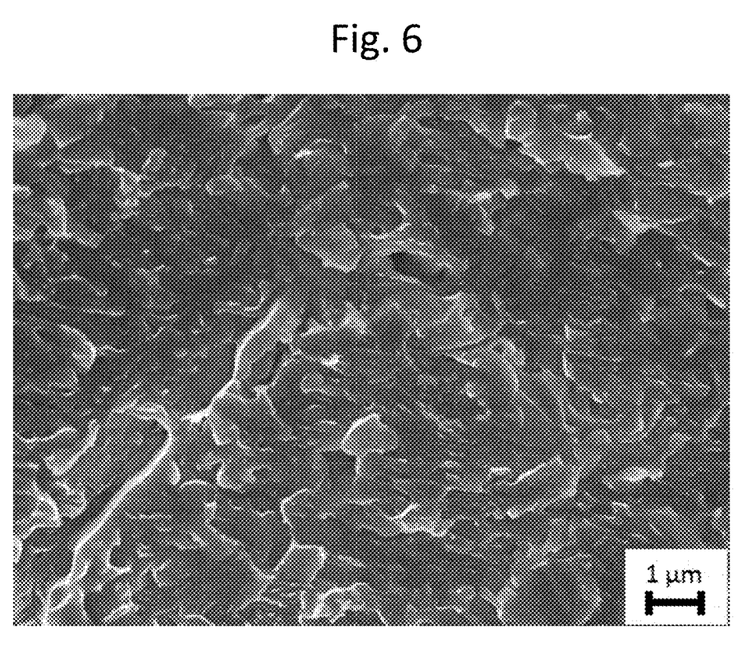
FIG. 6: scanning electron micrograph of the fracture surface parallel to the direction of construction of inventive Mo—C sample No. 3 produced via SLM.

Powders 1 to 8 were processed by means of a 400 W SLM system to give samples of dimensions 10 mm×10 mm×10 mm and to give notched impact bending samples according to DIN EN ISO 148-1. The notched impact bending samples were constructed with the notch pointing upward on the base plate. Thus, a fracture surface produced by the notched impact bending test is parallel to the direction of construction. The SLM process was conducted under the same conditions as described for the samples according to prior art. The samples were again separated from the base plate by wire erosion and the density was determined by the buoyancy method, with open porosity having been closed by dipping into molten paraffin. In the case of the Mo—C samples densities in the range from 97.1% to 98.6% of the theoretical density were determined, in the case of W—C from 96.9% to 98.4% and in the case of Mo—W—C 96.1%. Sections of the samples were produced, the notched impact samples were tested according to DIN EN ISO 148-1, the fracture surface was examined by scanning electron microscopy and thin sections were analysed by means of TEM and EELS. FIGS. 4a and 4b, using the example of sample 3, show the microstructure of the samples according to the invention. In FIG. 4a, the section plane is at right angles to the direction of construction. The section plane is thus parallel to the base plate. The component is free of cracks and has a very fine-grain microstructure. The grain boundaries are interdigitated, which makes intercrystalline fracture difficult. FIG. 4b shows the microstructure in a plane parallel to the direction of construction. The grain structure is globular with an average grain aspect ratio (GAR value) close to 1. TEM images (see, for example, FIGS. 5a and 5b) of this sample show that ultrafine Mo carbides (see FIG. 5a with EELS result in FIG. 5c) are embedded in a pure Mo matrix (see FIG. 5b with EELS result in FIG. 5d). The EELS results in 5c were recorded at the measurement point indicated in 5a. The marked shoulder in 5c, in the range between 300 and about 450 eV, results from the carbon present in the form of Mo carbides. The EELS results in 5d were recorded at the measurement point shown in 5b. In 5d, in the range from 300 to 450 eV, no peak caused by carbon is apparent—this is therefore pure Mo. The fine carbide distribution in the Mo matrix ensures that thermally induced stresses in the soft Mo matrix can be dissipated by deformation. The fracture surface of sample 3 generated by the notched impact bending test is shown in FIG. 6. The fracture surface generated is parallel to the direction of construction. The fracture is transcrystalline without intercrystalline components.

The results of the chemical analysis are shown in Table 3. In all samples, it was possible to establish an oxygen content of less than <0.1 at %.

TABLE 3

| No. | Base metal | Production method | Oxygen content [at %] | Carbon content [at %] |
|---|---|---|---|---|
| 1 | Mo | A | 0.07 | 0.32 |
| 2 | Mo | A | 0.008 | 0.6 |
| 3 | Mo | B | 0.002 | 16.6 |
| 4 | W | A | 0.09 | 0.09 |
| 5 | W | A | 0.01 | 5.1 |
| 6 | W | A | 0.005 | 23.5 |
| 7 | Mo—W mixture (70 at % Mo; 30 at % W) | B | 0.07 | 1.0 |
| 8 | Mo | C | 0.09 | 2.7 |

The invention claimed is:

1. A component, comprising:
a multiplicity of individual powder particles of molybdenum, a molybdenum-based alloy, tungsten or a tungsten-based alloy fused together into a solid structure;
said particles having characteristics of having been fused together by a high-energy beam in an additive manufacturing method; and
the component having an oxygen content of not more than 0.1 at % and a carbon content of not less than 0.08 at %.

2. The component according to claim 1, wherein the component has a carbon content of not more than 25 at %.

3. The component according to claim 1, wherein the component has a carbon content in at % of not less than the oxygen content in at %.

4. The component according to claim 1, which further comprises carbides embedded in a matrix of pure molybdenum or pure tungsten.

5. The component according to claim 1, which further comprises more than 25 at % of molybdenum carbide or tungsten carbide, based on a total content of carbon.

6. The component according to claim 1, which further comprises:
a direction of construction;
a fracture area; and
transcrystalline fracture characteristics over at least 50% of said fracture area in a fracture plane parallel to said direction of construction.

7. The component according to claim 1, which further comprises:
a direction of construction;
a fracture area; and
transcrystalline fracture characteristics over at least 50% of said fracture area in a fracture plane at right angles to said direction of construction.

8. The component according to claim 1, wherein the component is free of intermetallic phases.

9. The component according to claim 1, which further comprises a sum total of metallic alloy elements of not more than 2 at %, not including molybdenum as an alloy element in tungsten or tungsten as an alloy element in molybdenum.

10. The component according to claim 1, which further comprises an average grain aspect ratio value of less than 5 in a plane parallel to a direction of construction.

11. An additive manufacturing method for production of a component, the method comprising the following steps:
providing a starting powder including particles of molybdenum, a molybdenum-based alloy, tungsten or a tungsten-based alloy having been produced by at least one of granulation or a melt phase;
providing the powder with a carbon content in a region of not less than 0.15 at %;
carrying out layer-by-layer fusion of the particles of the starting powder with a high-energy beam; and
providing the component with an oxygen content of not more than 0.1 at % and a carbon content of not less than 0.08 at %.

12. The additive manufacturing method according to claim 11, which further comprises providing the carbon content of the powder as not more than 25 at %.

13. The additive manufacturing method according to claim 11, which further comprises carrying out the step of providing the starting powder by including carburization and spheroidization in the melt phase, and carrying out the step of carburization before, during or after the step of spheroidization.

14. The additive manufacturing method according to claim 13, which further comprises carrying out the spheroidization in the melt phase in a C-containing atmosphere in a plasma.

15. The additive manufacturing method according to claim 11, which further comprises carrying out the step of providing the starting powder by including granulation of a raw powder to which a carbonaceous substance has been added.

16. The additive manufacturing method according to claim 11, which further comprises carrying out the step of layer-by-layer fusion by additionally supplying thermal energy to the component to be produced.

17. A method of using a powder, the method comprising the following steps:
producing a multiplicity of individual powder particles of molybdenum, a molybdenum-based alloy, tungsten or a tungsten-based alloy fused together by a high-energy beam into a solid structure by at least one of granulation or a melt phase;
providing the powder with an average carbon content in a region of not less than 0.15 at % for an additive manufacturing method; and
producing a component having an oxygen content of not more than 0.1 at % and a carbon content of not less than 0.08 at %.

18. The method according to claim 17, which further comprises selecting the additive manufacturing method as selective laser melting, selective electron beam melting or laser metal deposition.

* * * * *